United States Patent
Da Silva et al.

(10) Patent No.: US 11,206,104 B2
(45) Date of Patent: Dec. 21, 2021

(54) APPARATUS, SYSTEM AND METHOD OF COMMUNICATING AN ENHANCED DIRECTIONAL MULTI-GIGABIT (DMG) (EDMG) ORTHOGONAL FREQUENCY-DIVISION MULTIPLEXING (OFDM) PHYSICAL LAYER (PHY) PROTOCOL DATA UNIT (PPDU)

(71) Applicant: INTEL IP CORPORATION, Santa Clara, CA (US)

(72) Inventors: Claudio Da Silva, Portland, OR (US); Artyom Lomayev, Nizhny Novgorod (RU); Alexander Maltsev, Nizhny Novgorod (RU); Carlos Cordeiro, Portland, OR (US); Michael Genossar, Modiin (IL)

(73) Assignee: INTEL CORPORATION, Santa Clara, CA (US)

(*) Notice: Subject to any disclaimer, the term of this patent is extended or adjusted under 35 U.S.C. 154(b) by 66 days.

(21) Appl. No.: 16/831,492

(22) Filed: Mar. 26, 2020

(65) Prior Publication Data
US 2020/0228241 A1    Jul. 16, 2020

Related U.S. Application Data

(63) Continuation of application No. 16/626,556, filed as application No. PCT/US2018/039429 on Jun. 26, 2018.
(Continued)

(51) Int. Cl.
*H04L 1/00* (2006.01)
*H04B 7/06* (2006.01)
(Continued)

(52) U.S. Cl.
CPC ......... *H04L 1/0082* (2013.01); *H04B 7/0695* (2013.01); *H04L 1/0008* (2013.01);
(Continued)

(58) Field of Classification Search
CPC ............... H04L 1/0082; H04L 27/2605; H04L 27/2608; H04L 69/22; H04L 1/0008; H04L 69/323; H04L 27/2602; H04B 7/0695
See application file for complete search history.

(56) References Cited

U.S. PATENT DOCUMENTS 10,484,980 B1 *  11/2019  Jiang ................... H04B 7/0695
2013/0202017 A1   8/2013  Tzannes et al.
(Continued)

FOREIGN PATENT DOCUMENTS

WO    WO-2016140402 A1 *  9/2016 ............. H04L 27/26

OTHER PUBLICATIONS

International Search Report and the Written Opinion for International Application No. PCT/US2018/039429, dated Oct. 29, 2018, 11 pages.
(Continued)

*Primary Examiner* — Shailendra Kumar
(74) *Attorney, Agent, or Firm* — Shichrur & Co.

(57) ABSTRACT

Some demonstrative embodiments include apparatuses, devices, systems and methods of communicating an Enhanced Directional Multi-Gigabit (DMG) (EDMG) Orthogonal Frequency-Division Multiplexing (OFDM) Physical layer (PHY) Protocol Data Unit (PPDU). For example, an EDMG station (STA) may be configured to generate an EDMG OFDM PPDU including at least a non-EDMG header (L-Header), an EDMG header, and a data field, the EDMG header including a spoofing error length indicator field configured to indicate whether or not
(Continued)

a spoofing error of the EDMG OFDM PPDU is less than one OFDM symbol duration; and to transmit the EDMG OFDM PPDU over a channel bandwidth in a frequency band above 45 Gigahertz (GHz).

23 Claims, 5 Drawing Sheets

Related U.S. Application Data

(60) Provisional application No. 62/525,229, filed on Jun. 27, 2017.

(51) Int. Cl.
   *H04L 27/26* (2006.01)
   *H04L 29/06* (2006.01)
   *H04L 29/08* (2006.01)

(52) U.S. Cl.
   CPC ...... *H04L 27/2605* (2013.01); *H04L 27/2608* (2013.01); *H04L 69/22* (2013.01); *H04L 69/323* (2013.01)

(56) References Cited

U.S. PATENT DOCUMENTS

2016/0330738 A1  11/2016  Eitan
2018/0367650 A1* 12/2018  Motozuka .......... H04W 28/06
2019/0068258 A1*  2/2019  Oteri ................. H04B 7/0617
2019/0191331 A1*  6/2019  Park .................. H04L 1/0025
2020/0252253 A1   8/2020  Da Silva et al.

OTHER PUBLICATIONS

Sungjin Park et al., 'Length Calculation in EDMG PPDU', IEEE 802.11-17/0750r0), May 8, 2017, 8 pages.

Hiroyuki Motozuka et al., 'L-Header spoofing for EDMG SC PPDU', IEEE 802.11-17/0105r0, Jan. 16, 2017, 17 pages.

Claudio Da Silva et al., 'Spoofing of EDMG Control Mode PPDUs', IEEE 802.11-17/0053r0, Jan. 15, 2017, 12 pages.

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

International Preliminary Report on Patentability for International Application No. PCT/US2018/039429, dated Jan. 9, 2020, 7 pages.

Office Action for U.S. Appl. No. 16/626,556, dated May 24, 2021, 26 pages.

Notice of Allowance for U.S. Appl. No. 16/626,556, dated Aug. 27, 2021, 9 pages.

* cited by examiner

APPARATUS, SYSTEM AND METHOD OF COMMUNICATING AN ENHANCED DIRECTIONAL MULTI-GIGABIT (DMG) (EDMG) ORTHOGONAL FREQUENCY-DIVISION MULTIPLEXING (OFDM) PHYSICAL LAYER (PHY) PROTOCOL DATA UNIT (PPDU)

CROSS REFERENCE

This application claims the benefit of and priority from U.S. Provisional Patent Application No. 62/525,229 entitled "APPARATUS, SYSTEM AND METHOD OF COMMUNICATING AN ENHANCED DIRECTIONAL MULTI-GIGABIT (EDMG) PHYSICAL LAYER PROTOCOL DATA UNIT (PPDU) WITH A SPOOFED LENGTH", filed Jun. 27, 2017, the entire disclosure of which is incorporated herein by reference.

TECHNICAL FIELD

Embodiments described herein generally relate to communicating an Enhanced Directional Multi-Gigabit (DMG) (EDMG) Orthogonal Frequency-Division Multiplexing (OFDM) Physical Layer (PHY) Protocol Data Unit (PPDU).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
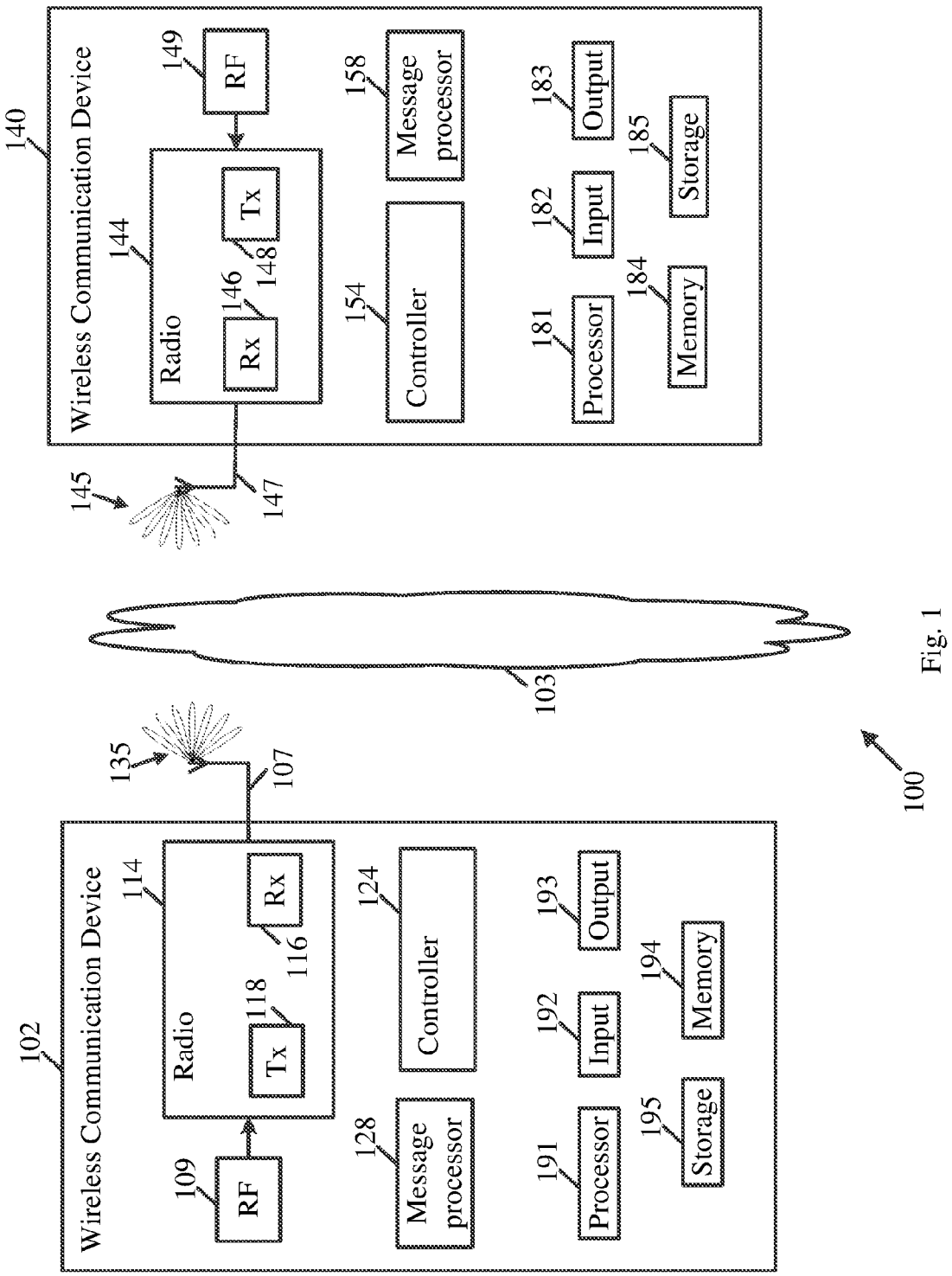
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 7: Enhanced Throughput for Operation in License Exempt Bands Above 45 GHz, November 2017)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band/or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAB. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
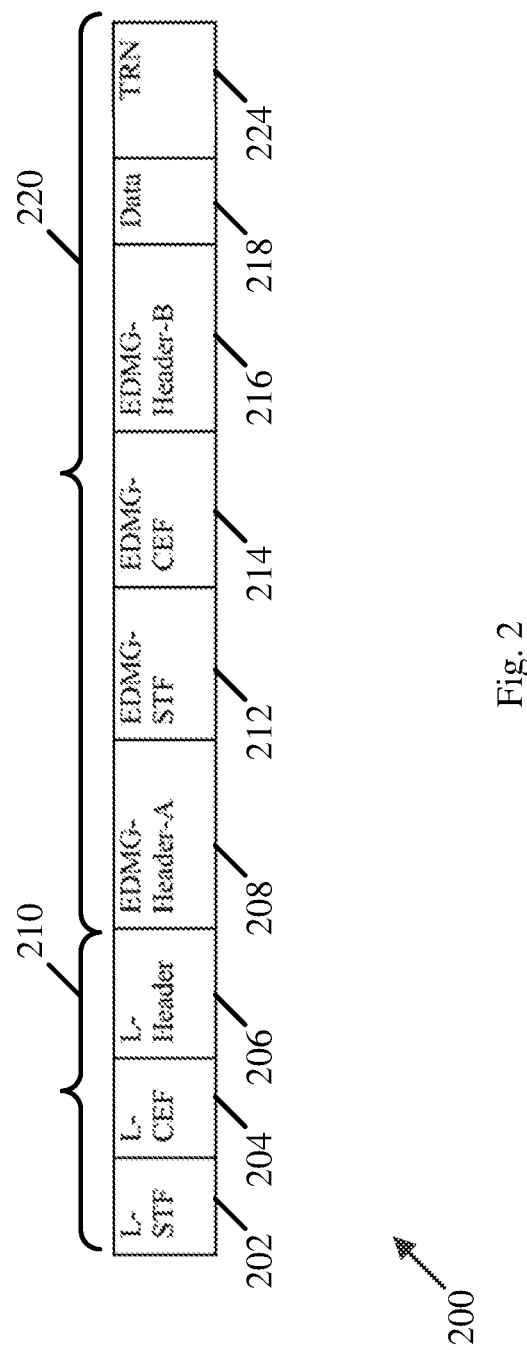
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

In some demonstrative embodiments, EDMG-Header-B field 216 may be included, for example, in EDMG MU PPDUs, for example, on a per STA basis.

In some demonstrative embodiments, EDMG-Header-B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102 and/or 140 may be configured to generate, transmit, receive and/or process one or more transmissions, e.g., including one or more EDMG PPDUs, e.g., as described below.

In some demonstrative embodiments, a spoofing error, e.g., as defined for EDMG Single Carrier (SC) PPDUs, may have the same requirements as the requirements for a spoofing error of EDMG OFDM PPDUs.

In some demonstrative embodiments, for example, for EDMG SC PPDUs and/or OFDM PPDUs, the spoofing error may be less than one SC symbol block.

In some demonstrative embodiments, for example, for EDMG OFDM PPDUs, in some transmissions, use cases and/or scenarios, the spoofing error may even be larger than one OFDM symbol block, e.g., as described below. In one example, the spoofing error may be greater than one OFDM symbol block and less than one SC block.

In some demonstrative embodiments, devices 102 and/or 140 may be configured to generate, encode, transmit, receive, decode and/or process one or more transmissions of PPDUs, for example, using signaling, which may be configured to support, for example, decoding of multi-user EDMG OFDM PPDUs, e.g., as described below.

In some demonstrative embodiments, devices 102 and/or 140 may be configured to generate, encode, transmit, receive, decode one or more transmissions of PPDUs, for example, EDMG PPDUs, with a spoofing error length indicator, e.g., as described below.

In some demonstrative embodiments, devices 102 and/or 140 may be configured to generate, encode, transmit, receive, decode one or more transmissions of PPDUs, for example, using a spoofing error length indicator field, which may be included, for example, in an EDMG header of an EDMG OFDM PPDU and/or in any other portion of the EDMG OFDM PPDU, e.g., as described below.

In some demonstrative embodiments, the spoofing error length indicator field may be configured to indicate whether one or more spoofed values transmitted in a header of the PPDU, for example, in L-header 206 (FIG. 2), e.g., a legacy header of the PPDU, may result in a spoofing error that is less than or greater than one OFDM symbol block, e.g., as described below.

Some demonstrative embodiments are described herein with respect to a spoofing error length indicator field configured to indicate that a spoofing error is less than or greater than one OFDM symbol block. In other embodiments, the spoofing error length indicator field may be configured to indicate that a spoofing error is less than or greater than any other number of OFDM symbol block and/or whether the spoofing error is within any other range.

In some demonstrative embodiments, an EDMG STA, e.g., an EDMG STA implemented by devices 102 and/or 140, may be configured to process a multi-user EDMG OFDM PPDU, for example, to determine the length of padding, e.g., introduced in the encoding of the PPDU, for example, by using the spoofing error length indicator field, e.g., as described below.

In some demonstrative embodiments, the spoofing error of a PPDU, for example, an EDMG SC PPDU and/or an EDMG OFDM PPDU, e.g., in accordance with an IEEE 802.11ay Specification or any other Specification, may be defined, for example, as a difference between a PPDU duration calculated based on one or more fields of a header of the PPDU, for example, L-Header 206 (FIG. 2), and an actual PPDU duration. In other embodiments, any other definition of the spoofing error may be implemented.

In one example, a spoofed length of an EDMG SC PPDU and/or an EDMG OFDM PPDU may be determined, for example, based on the values of one or more fields, for example, a Length field, a TRN Length field, and a Modulation and Coding Scheme (MCS) field, in L-Header 206 (FIG. 2) of the PPDU, e.g., as described below. In other embodiments, any other additional or alternative values and/or fields may be used for the calculated (spoofed) PPDU length.

In some demonstration embodiments, the spoofing error of a PPDU, for example, of EDMG SC PPDUs and/or EDMG OFDM PPDUs, which may be determined, for example, in accordance with an IEEE 802.11 ay Specification or any other Specification, may be less than 512× $T_C \cong 291$ nanoseconds (ns), wherein $T_C = 1/F_C \cong 0.57$ ns is a SC chip time and $F_C = 1760$ Megahertz (MHz) is a SC chip rate.

In some demonstrative embodiments, for example, in accordance with an IEEE 802.11ay Specification, a SC symbol block duration may be equal to $512 \times T_C \cong 291$ ns for all cases, for example, for short/normal/long Guard Interval (GI), SU SISO/MIMO, A-PPDU, and/or MU PPDU and/or any other cases. Accordingly, for example, the spoofing error for EDMG SC PPDUs may be less than one SC symbol block.

In some demonstrative ck.

In some demonstrative embodiments, for example, in accordance with an IEEE 802.11ay Specification or any other Specification, an OFDM Discrete Fourier Transform (DFT) or inverse DFT (IDFT) period may be equal, for example, to approximately 194 ns, and/or Guard Intervals (GIs) may be defined to have a duration equal to 18.18 ns, 36.36 ns, and/or 72.72 ns, e.g., for short, normal, and long GIs, respectively. Accordingly, a duration of an OFDM symbol may be in a range between ~212 ns to ~267 ns. Accordingly, the spoofing error of an EDMG OFDM PPDU, e.g., which has a maximum duration of 291 ns, may be greater than one OFDM symbol block.

In other embodiments, any other DFT/IDFT period and/or GI may be implemented, and/or OFDM symbol may have any other duration.

In some demonstrative embodiments, in some use cases, scenarios and/or implementations, there may be a technical need to address this spoofing error, for example, to support processing and/or communicating of EDMG OFDM PPDUs, e.g., as described below.

In some demonstrative embodiments, a field indicating the spoofing error length may be included in a header of an EDMG PPDU, e.g., as described below.

In some demonstrative embodiments, the field indicating the spoofing error length may be configured to support processing and/or signaling requirements for EDMG PPDUs, for example, EDMG OFDM PPDUs, for example, to address situations where the spoofing error may be greater than one OFDM symbol block, e.g., as described below.

In some demonstrative embodiments, a field indicating the spoofing error length may be included in a header of an EDMG PPDU, for example, in the EDMG-Header-A 208 (FIG. 2). For example, a name of the field may be "spoofing error length indicator" or any other suitable name.

In some demonstrative embodiments, a field indicating the spoofing error length may be included, for example, in the EDMG-Header-B 216 (FIG. 2). For example, a name of the field may be "spoofing error length indicator" or any other suitable name.

In other embodiments, the field indicating the spoofing error length may be included in any other portion or header of the PPDU.

In some demonstrative embodiments, the field indicating the spoofing error length may indicate, for example, whether the spoofing error of the EDMG PPDU is less than or greater than one OFDM symbol block.

In some demonstrative embodiments, the field may include a 1-bit field, or a field of any other bit size.

In some demonstrative embodiments, a first value of the field, e.g., the spoofing error length indicator field, may be defined to be equal to a first value, e.g., "0", for example, when the spoofing error is less than one OFDM symbol block.

In some demonstrative embodiments, a second value of the field, e.g., the spoofing error length indicator field, may be defined to be equal to a second value, e.g., "1", for example, when the spoofing error is greater than one OFDM symbol block.

In one example, if the spoofing error is equal to one OFDM symbol block, the field, e.g., the spoofing error length indicator field, may include the value "0".

In another example, if the spoofing error is equal to 1 OFDM symbol block, the field, e.g., the spoofing error length indicator field, may include the value "1".

In other embodiments, any other possible value may be assigned for the field, e.g., the spoofing error length indicator field, that allows a station to determine whether the spoofing error of an EDMG OFDM PPDU is less than, equal to, or greater than one OFDM symbol block.

In some demonstrative embodiments, one of the values of the spoofing error length indicator field may indicate that the spoofing error is equal to one OFDM symbol.

In one example, the value "0" may indicate that the spoofing error is less than or equal to one OFDM symbol block. In another example, the value "1" may indicate that the spoofing error is equal to or greater than one OFDM symbol block.

In some demonstrative embodiments, the field, e.g., the spoofing error length indicator field, may be defined to be included in a header field, for example, the EDMG-Header-A 208 (FIG. 2) and/or EDMG-Header-B 216 (FIG. 2), for example, of all EDMG OFDM PPDUs.

In other embodiments, the field, e.g., the spoofing error length indicator field, may be defined to be included only for specific EDMG OFDM PPDU formats/configurations, for example, only for EDMG OFDM PPDUs used in multi-user transmission, and/or any other type of EDMG PPDU. In some demonstrative embodiments, devices 102 and 140 may be configured to communicate an OFDM EDMG PPDU including the spoofing error length indicator field, which indicates whether or not a spoofing error of the EDMG OFDM PPDU may be less than one OFDM symbol duration, e.g., as described below.

In some demonstrative embodiments, device 102 may be configured to generate and transmit the EDMG OFDM PPDU, and/or device 140 may be configured to receive and process the EDMG OFDM PPDU from device 102, e.g., as described below.

In some demonstrative embodiments, controller 124 may be configured to control, cause and/or trigger the STA implemented by device 102 to generate an EDMG OFDM PPDU, e.g., according to the format of EDMG PPDU 200 (FIG. 2), including at least a non-EDMG header (L-Header), e.g., L-Header 206 (FIG. 2), an EDMG header, e.g., EDMG Header A 208 (FIG. 2) and/or EDMG Header B 216 (FIG. 2), and a data field, e.g., data field 218 (FIG. 2), as described below.

In some demonstrative embodiments, the EDMG header may include a spoofing error length indicator field configured to indicate whether or not a spoofing error of the EDMG OFDM PPDU is less than one OFDM symbol duration, e.g., as described below.

In some demonstrative embodiments, controller 124 may be configured to control, cause and/or trigger the STA implemented by device 102 to transmit the EDMG OFDM PPDU over a channel bandwidth in a frequency band above 45 GHz, e.g., as described below.

In some demonstrative embodiments, controller 124 may be configured to control, cause and/or trigger the STA implemented by device 102 to transmit the EDMG OFDM PPDU over a channel bandwidth of at least 2.16 GHz, e.g., as described below.

In other embodiments, and other suitable frequency band and/or channel bandwidth may be used.

In some demonstrative embodiments, controller 124 may be configured to control, cause and/or trigger the STA implemented by device 102 to set the spoofing error length indicator field to a first value or a second value, e.g., as described below.

In some demonstrative embodiments, the first value may indicate that the spoofing error of the EDMG OFDM PPDU is less than one OFDM symbol duration, and the second value may indicate that the spoofing error of the EDMG OFDM PPDU is equal to or greater than one OFDM symbol duration, e.g., as described below.

In some demonstrative embodiments, the first value may be "0" and the second value may be "1". In other embodiments, the first and/or second values may include any other values.

In some demonstrative embodiments, the spoofing error length indicator field may include one bit, e.g., as described below.

In other embodiments, the spoofing error length indicator field may have any other bit size. e.g., greater than one bit.

In some demonstrative embodiments, the spoofing error of the EDMG OFDM PPDU may include a difference between a calculated PPDU duration and an actual duration of the EDMG OFDM PPDU, e.g., as described below.

In some demonstrative embodiments, the calculated PPDU duration may be calculated according to the L-header, for example, L-header 206 (FIG. 2), e.g., as described below.

In some demonstrative embodiments, the L-Header may include at least a length field, a Training (TRN) length field, and/or a Modulation and Coding Scheme (MCS) field, e.g., as described below.

In some demonstrative embodiments, the calculated PPDU duration calculated according to the L-header, may be, for example, based on the length field, the TRN length field and/or the MCS field.

In some demonstrative embodiments, the EDMG OFDM PPDU may include a MU PPDU, e.g., as described below.

In some demonstrative embodiments, the MU PPDU may include an EDMG Header A, e.g., EDMG Header A 208 (FIG. 2), after the L-Header, and an EDMG Header B, e.g., EDMG Header B 216 (FIG. 2), after the EDMG Header A, e.g., as described below.

In some demonstrative embodiments, the EDMG Header B may include the spoofing error length indicator field, e.g., as described below.

In some demonstrative embodiments, device 140 may be configured to receive and process the EDMG OFDM PPDU from device 102, e.g., as described below.

In some demonstrative embodiments, controller 154 may be configured to control, cause and/or trigger the STA implemented by device 140 to receive the EDMG OFDM PPDU over the channel bandwidth in the frequency band above 45 GHz. The EDMG OFDM PPDU may include the non-EDMG header (L-Header), the EDMG header, and the data field. The EDMG header may include the spoofing error length indicator field configured to indicate whether or not the spoofing error of the EDMG OFDM PPDU is less than one OFDM symbol duration.

In some demonstrative embodiments, controller 154 may be configured to control, cause and/or trigger the STA implemented by device 140 to receive the EDMG OFDM PPDU over the channel bandwidth of at least 2.16 GHz.

In some demonstrative embodiments, controller 154 may be configured to control, cause and/or trigger the STA implemented by device 140 to calculate a duration of the data field of the EDMG OFDM PPDU, e.g., data field 218 (FIG. 2), for example, based on the spoofing error length indication field, e.g., as described below.

In some demonstrative embodiments, controller 154 may be configured to control, cause and/or trigger the STA implemented by device 140 to determine that the spoofing error of the EDMG OFDM PPDU is less than one OFDM symbol duration, for example, when the spoofing error length indicator field has the first value, e.g., "0".

In some demonstrative embodiments, controller 154 may be configured to control, cause and/or trigger the STA implemented by device 140 to determine that the spoofing error of the EDMG OFDM PPDU is equal to or greater than one OFDM symbol duration, for example, when the spoofing error length indicator field has the second value, e.g., "1".

In some demonstrative embodiments, controller 154 may be configured to control, cause and/or trigger the STA implemented by device 140 to allow the EDMG STA to enter a power save state, for example, based on the calculated duration of the data field.

In one example, device 102 may transmit to device 140 the EDMG PPDU including EDMG PPDU format 200 (FIG. 2). According to this example, EDMG-Header-A 208 (FIG. 2) or EDMG-Header-B 216 (FIG. 2) may include the spoofing error length indicator field to indicate whether or not the spoofing error of the EDMG OFDM PPDU may be less than one OFDM symbol duration. For example, the calculated PPDU duration may be calculated according to the L-header header 206 (FIG. 2). For example, device 140 may determine a duration of data field 218 (FIG. 2), for example, based on the spoofing error length indication field.

In some demonstrative embodiments, devices 102 and/or 140 may be configured to utile the spoofing error length indication field to enable a receiver STA, e.g., device 140, to determine number of one or more padding OFDM symbols after the data field, e.g., data field 218 (FIG. 2) and/or a beginning of a Training (TRN) field, e.g., TRN field 224 (FIG. 2), after the data field in the EDMG OFDM PPDU, e.g., as described below.

In some demonstrative embodiments, devices 102 and/or 140 may be configured to utilize the spoofing error length indication field to enable the receiver STA to determine the number of the padding OFDM symbols and/or the beginning of the TRN field, for example, to enable transmission of a Multi-User (MU) PPDU, e.g., as described below.

In some demonstrative embodiments, an EDMG STA configured to transmit an EDMG PPDU, e.g., an EDMG STA implemented by devices 102 and/or 140, may include an encoder of a multi-user EDMG PPDU, e.g., an EDMG MU SC PPDU and/or an EDMG MU OFDM PPDU, which may be configured to pad data intended for different users with zeros, for example, in order to make the encoded data field of different users that are multiplexed in the same PPDU, to have the same length, e.g., the same number of symbol blocks.

In some demonstrative embodiments, a user addressed by a MU EDMG PPDU, e.g., each user, may decode the received data field of the MU EDMG PPDU, for example, based on knowledge of the number of padding symbols added to their stream(s), e.g., in the encoding process.

In some demonstrative embodiments, an EDMG STA to receive an EDMG PPDU, e.g., an EDMG STA implemented by devices 102 and/or 140, may include a decoder to decode the received data field, for example, according to the number of padding symbols added to the stream(s) of a user in the encoding process.

In some demonstrative embodiments, device 102 may be configured to encode the MU EDMG PPDU, and/or device 140 may be configured to decode the MU EDMG PPDU, e.g., as described below.

In some demonstrative embodiments, the spoofing error length indicator field may be configured to support calculation at a receiver STA, e.g., device 140, of a number of one or more padding OFDM symbols after the data field which, which was encoded by device 102, e.g., as described below.

In some demonstrative embodiments, the spoofing error length indicator field may be configured to support calculation at a receiver STA, e.g., device 140, of a beginning of a TRN field after the data field in the EDMG OFDM PPDU, which was encoded by device 102, e.g., as described below.

In some demonstrative embodiments, controller 154 may be configured to control, cause and/or trigger the STA implemented by device 140 to determine a number of one or more padding OFDM symbols after the data field of the EDMG OFDM PPDU, for example, based on the spoofing error length indicator field, e.g., as described below.

In some demonstrative embodiments, controller 154 may be configured to determine a beginning of a Training (TRN) field after the data field in the EDMG OFDM PPDU, for example, based on the spoofing error length indicator field, e.g., as described below.

In some demonstrative embodiments, controller 154 may be configured to control, cause and/or trigger the STA implemented by device 140 to determine a calculated number of padding OFDM symbols, for example, based on the L-header, e.g., as described below.

In some demonstrative embodiments, controller 154 may be configured to control, cause and/or trigger the STA implemented by device 140 to select whether or not to discard at least one padding OFDM symbol from the calculated number of padding OFDM symbols, for example, based on the spoofing error length indicator field, e.g., as described below.

In some demonstrative embodiments, controller 154 may be configured to control, cause and/or trigger the STA implemented by device 140 to select to discard the at least one padding OFDM symbol, for example, when the spoofing error length indicator field indicates that the spoofing error of the EDMG OFDM PPDU is not less than one OFDM symbol duration, e.g., as described below.

In some demonstrative embodiments, controller 154 may be configured to control, cause and/or trigger the STA implemented by device 140 to select to discard less than one padding OFDM symbol, for example, when the spoofing error length indicator field indicates that the spoofing error of the EDMG OFDM PPDU is less than one OFDM symbol duration, e.g., as described below.

In some demonstrative embodiments, controller 154 may be configured to control, cause and/or trigger the STA implemented by device 140 to determine a total duration of the data field and one or more padding OFDM symbols, for example, based on a plurality of values in the L-Header of the EDMG OFDM PPDU, e.g., as described below.

In some demonstrative embodiments, controller 154 may be configured to control, cause and/or trigger the STA implemented by device 140 to determine a number of data OFDM symbols of the data field, for example, based on the spoofing error length indicator field and the total duration of the data field and the padding OFDM symbols, e.g., as described below.

In some demonstrative embodiments, controller 154 may be configured to control, cause and/or trigger the STA implemented by device 140 to determine the duration of the data field, for example, based on the number of data OFDM symbols, e.g., as described below.

In other embodiments, any other additional or alternative operations and/or calculations may be implemented to determine the duration of the data field and/or the number of padding OFDM symbols.

In some demonstrative embodiments, devices 102 and/or 140 may be configured to decode a multi-user EDMG SC PPDU, for example, according to a first EDMG SC PPDU decoding scheme (procedure), e.g., as described below.

In some demonstrative embodiments, devices 102 and/or 140 may be configured to implement some or all operations of the first EDMG SC PPDU decoding scheme and/or one or more additional or alternative operations.

In some demonstrative embodiments, the first EDMG SC PPDU decoding scheme may include, for example, the following operations:
1. Ignore the spoofed values indicated in the L-Header (e.g., the length, TRN length, and/or MCS fields) of the multi-user EDMG PPDU, e.g., when performing the decoding.
2. Calculate the duration of the data field (e.g., which does not include the padding) by using the values indicated in one or more fields of one or more EDMG headers, for example, a PSDU Length field, an EDMG-MCS1 field, and/or an EDMG-MCS2 field in the EDMG-Header-B of the multi-user EDMG PPDU.
3. For example, a field "Number of Padded Symbols" may be defined, for example, in an EDMG-Header-B of multi-user EDMG PPDUs, that indicates to an intended user, e.g., each intended user, the number of padded symbols added in the transmission of the corresponding data field.

In other embodiments, the first EDMG SC PPDU decoding scheme may include any other alternative and/or additional operations.

In some demonstrative embodiments, the first decoding scheme may be modified, for example, to support multi-user EDMG SC PPDUs, for example, by exploiting the fact that the spoofing error of EDMG SC PPDUs is always less than one SC symbol.

In some demonstrative embodiments, devices 102 and/or 140 may be configured to decode the multi-user EDMG SC PPDUs, for example, according to a second EDMG SC PPDU decoding scheme (procedure).

In some demonstrative embodiments, devices 102 and/or 140 may be configured to implement some or all operations of the second EDMG SC PPDU decoding scheme and/or one or more additional or alternative operations.

In some demonstrative embodiments, the second EDMG SC PPDU decoding scheme may include, for example, the following operations:
1. Calculate the total duration of the data and TRN fields of a multi-user EDMG SC PPDU, for example, by using the spoofed values indicated in the L-Header (e.g., length, TRN length, and/or MCS) of the multi-user EDMG SC PPDU. For example, this value may be correct, e.g., within one SC symbol block duration.

2. Determine the duration of the data field within one SC symbol block duration, for example, according to an exact duration of the TRN length, for example, as may be indicated in the EDMG-Header-A 208 (FIG. 2) of the multi-user EDMG SC PPDU, e.g., in accordance with an IEEE 802.11ay Specification. For example, the error may be identified and corrected, e.g., since the error is less than one SC symbol block. For example, with this operation, a receiver, e.g., a receiver of devices 102 and/or 140, may determine the total duration of the data field, which may include, for example, information symbols plus padding.

3. Calculate the duration of the data field (which does not include the padding), for example, using one or more values indicated in the EDMG-Header-B of the multi-user EDMG PPDU, for example, values in the PSDU Length, EDMG-MCS1, and/or EDMG-MCS2 fields of the EDMG-Header-B of the multi-user EDMG PPDU.

In other embodiments, the second EDMG SC PPDU decoding scheme may include any other alternative and/or additional operations.

In some demonstrative embodiments, an intended station, e.g., each intended station, e.g., device 102 and/or device 140, that receives a multi-user EDMG SC PPDU, may be able to correctly estimate a total duration of the data field, e.g., according to the second operation of the second EDMG SC PPDU decoding scheme, and/or the number of data and padded SC symbol blocks, e.g., according to the second and third operations of the second EDMG SC PPDU decoding scheme.

In some demonstrative embodiments, the second EDMG SC PPDU decoding scheme, may be implemented, for example, to allow a user to determine the length of the data field for the user, for example, even if a "number of padded SC symbols" field is not implemented or defined in the EDMG-Header-B 216 (FIG. 2) of a multi-user EDMG SC PPDU.

In some demonstrative embodiments, the second EDMG SC PPDU decoding scheme may not be sufficient, in some use cases, scenarios, and/or implementations, for example, with respect to EDMG OFDM PPDUs, e.g., multi-user EDMG OFDM PPDUs, for example, when the spoofing error may be greater than one OFDM symbol block, e.g., but less than two OFDM symbol blocks.

In some demonstrative embodiments, devices 102 and/or 140 may be configured to implement a signaling scheme to signal to an intended station, e.g., each intended station, of a transmitted multi-user EDMG OFDM PPDU, whether the spoofing error is less than or greater than one OFDM symbol block.

In some demonstrative embodiments, an EDMG STA, e.g., device 102, may include in a MU EDMG OFDM PPDU a field to indicate whether the spoofing error of the multi-user EDMG OFDM PPDU is less than or greater than one OFDM symbol block, e.g., as described above.

In some demonstrative embodiments, devices 102 and/or 140 may be configured to decode EDMG OFDM PPDUs, e.g., multi-user EDMG OFDM PPDUs, for example, according to an EDMG OFDM PPDU decoding scheme, for example, a multi-user EDMG OFDM PPDU decoding scheme, e.g., as described below.

In some demonstrative embodiments, one or more operations of the EDMG OFDM PPDU decoding scheme may be implemented by an EDMG STA, e.g., device 102 and/or device 140, to determine a duration of a data field of an EDMG OFDM PPDU, a multi-user (MU) EDMG OFDM PPDU and/or any other type of EDMG PPDU.

In some demonstrative embodiments, the MU EDMG OFDM PPDU decoding scheme (procedure) may include, for example, one or more operations, e.g., as described below.

In some demonstrative embodiments, the MU EDMG OFDM PPDU decoding scheme may include calculating a total duration of the data and TRN fields, for example, by using the spoofed values indicated in the L-Header, e.g., one or more values in the length, TRN length, and/or MCS fields of L-header 206 (FIG. 2), of an EDMG OFDM PPDU, e.g., a multi-user EDMG OFDM PPDU.

In one example, the error in the calculated value of the total duration of the data and TRN fields may be, for example, less than the duration of two OFDM symbol blocks.

In one example, intended EDMG STAs may calculate the total duration of the data and TRN fields, for example, using the spoofed values indicated in the L-Header, e.g., the length, the TRN length, and/or the MCS fields, of the multi-user EDMG OFDM PPDU. For example, the error in this value may be smaller than the duration of two OFDM symbol blocks.

In some demonstrative embodiments, the MU EDMG OFDM PPDU decoding scheme may include determining a duration of the data field, e.g., the total duration of the information symbols plus padding, for example, with an error of less than two OFDM symbol blocks. For example, the duration of the data field may be determined according to a duration, e.g., an exact duration, of the TRN length, for example, as may be indicated in the EDMG-Header-A of the EDMG OFDM PPDU, e.g., in accordance with an IEEE 802.11ay Specification.

In one example, the exact duration of the TRN length may be indicated in the EDMG-Header-A of the multi-user EDMG OFDM PPDU, e.g., in accordance with an IEEE 802.11ay Specification. According to this example, a STA receiving the multi-user EDMG OFDM PPDU may be able to determine the duration of the data field, e.g., information symbols plus padding, with an error of less than two OFDM symbol blocks.

For example, a STA, e.g., each STA addressed by a multi-user EDMG OFDM PPDU, may be able to identify and correct the error, for example, based on the signaling, e.g., the spoofing error length indicator field, which may indicate whether the spoofing error is smaller or greater than 1 OFDM symbol block.

In one example, the calculated data field length may be equal to 10.1 OFDM symbol blocks, and it is known that the error is smaller than one OFDM symbol block. According to this example, the STA would know that the data field includes 10 OFDM symbol blocks. However, if the error is greater than one OFDM symbol block, the STA would know that the data field includes 9 OFDM symbol blocks.

In some demonstrative embodiments, the MU EDMG OFDM PPDU decoding scheme may include calculating a duration of the data field, which does not include the padding, for example, using one or more values in the EDMG Header B, for example, by using one or more of the values indicated in the fields PSDU Length, EDMG-MCS1, and/or EDMG-MCS2 within the EDMG-Header-B of the multi-user EDMG OFDM PPDU. In other embodiments, any other fields and/or parameters may be used to determine the duration of the data field.

In some demonstrative embodiments, the MU EDMG OFDM PPDU decoding scheme may include any other alternative and/or additional operations.

In some demonstrative embodiments, the multi-user EDMG OFDM PPDU decoding procedure may enable an intended station, for example, each intended station, e.g., devices 102 and/or 104, which receives a multi-user EDMG OFDM PPDU, to estimate, e.g., correctly, a total duration of the data field, and/or the number of data and/or padded OFDM symbol blocks, e.g., as described above.

In some demonstrative embodiments, one or more operations of the multi-user EDMG OFDM PPDU decoding procedure may be implemented, for example, to allow a user to determine the length of the data field for the user, for example, even if a "number of padded SC symbols" field is not implemented or defined, e.g., in the EDMG-Header-B 216 (FIG. 2) of a multi-user EDMG OFDM PPDU.

In some demonstrative embodiments, one or more operations of the multi-user EDMG OFDM PPDU decoding procedure may be implemented, for example, using the definition of a field, e.g., even a single bit, in the EDMG-Header-B or any other header, for example, the spoofing error length indicator field, e.g., as described above.

In some demonstrative embodiments, devices 102 and/or 140 may be configured to process EDMG OFDM PPDUs, for example, by using the spoofing error length indicator field, which may be included in a header of an EDMG OFDM PPDU, for example, the EDMG-Header-A 208 (FIG. 2) or the EDMG-Header-B 216 (FIG. 2) of the EDMG OFDM PPDU, and which may indicate whether the spoofed values transmitted in the legacy header of the PPDU result in a spoofing error that is less than or greater than one OFDM symbol block, e.g., as described above.

In some demonstrative embodiments, devices 102 and/or 140 may be configured to process the multi-user EDMG OFDM PPDU, for example, by using the spoofing error length indicator field, e.g., as described above.

In some demonstrative embodiments, devices 102 and/or 140 may be configured decode the EDMG OFDM PPDU, for example, by using the spoofing error length indicator field, for example, to determine the length of the data field and/or the padding introduced by the encoding procedure, for example, according to one or more operations of the MU EDMG OFDM PPDU decoding procedure, e.g., as described above.

In some demonstrative embodiments, EDMG STAs processing a multi-user EDMG OFDM PPDU may be able to determine the length of the padding introduced in the encoding procedure, e.g., based on the spoofing error length indicator field. Accordingly, EDMG STAs processing a multi-user EDMG OFDM PPDU may be able to determine, for example, the actual length of the data field, e.g., without the padding, for example, based on the spoofing error length indicator field, e.g., as described above.

In some demonstrative embodiments, implementing one or more of the EDMG OFDM PPDU decoding procedure may allow, for example, to encode the EDMG OFDM PPDU, for example, even by performing padding at the PHY layer only, e.g., even without requiring padding at the MAC side.

Figure 3:
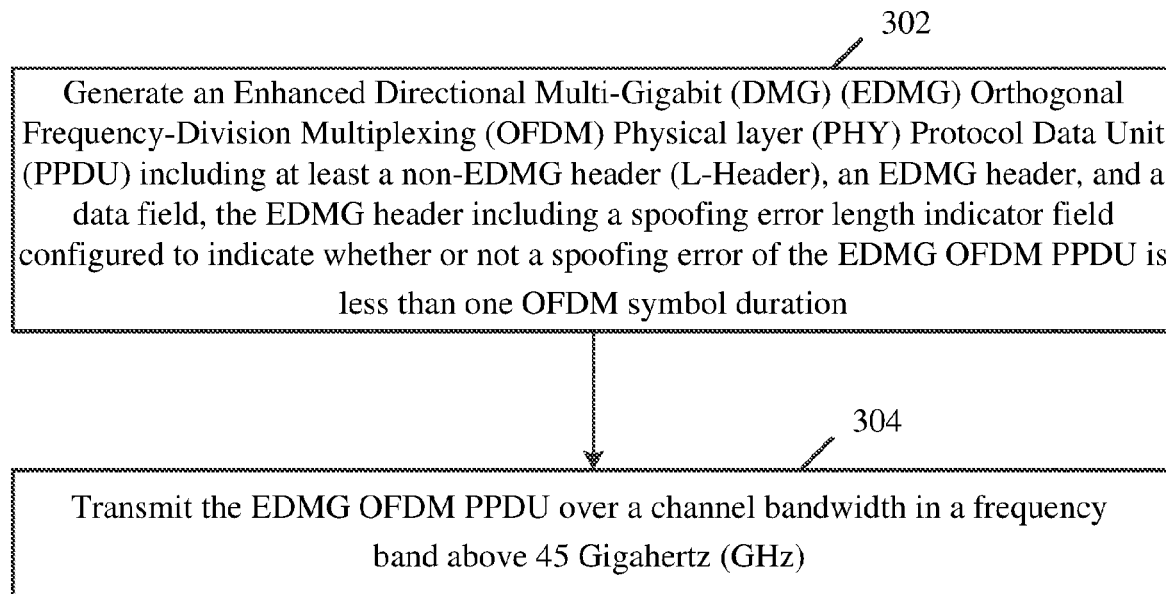
FIG. 3 is a schematic flow-chart illustration of a method of communicating an EDMG Orthogonal Frequency-Division Multiplexing (OFDM) PPDU, in accordance with some demonstrative embodiments.

Reference is made to FIG. 3, which schematically illustrates a method of communicating an EDMG OFDM PPDU, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 302, the method may include generating an EDMG OFDM PPDU including at least a non-EDMG header (L-Header), an EDMG header, and a data field, the EDMG header including a spoofing error length indicator field configured to indicate whether or not a spoofing error of the EDMG OFDM PPDU is less than one OFDM symbol duration. For example, controller 124 (FIG. 1) may be configured to cause, trigger, and/or control the wireless station implemented by device 102 (FIG. 1) to generate the EDMG OFDM PPDU, e.g., according to the format of EDMG PPDU 200 (FIG. 2), including at least the non-EDMG header (L-Header), e.g., L-Header 206 (FIG. 2), the EDMG header, e.g., EDMG Header B 216 (FIG. 2), and the data field, e.g., data field 218 (FIG. 2), the EDMG header including the spoofing error length indicator field configured to indicate whether or not the spoofing error of the EDMG OFDM PPDU is less than one OFDM symbol duration, e.g., as described above.

As indicated at block 304, the method may include transmitting the EDMG OFDM PPDU over a channel bandwidth in a frequency band above 45 GHz. For example, controller 124 (FIG. 1) may be configured to cause, trigger, and/or control the wireless station implemented by device 102 (FIG. 1) to transmit the EDMG OFDM PPDU over the channel bandwidth in the frequency band above 45 GHz, e.g., as described above.

Figure 4:
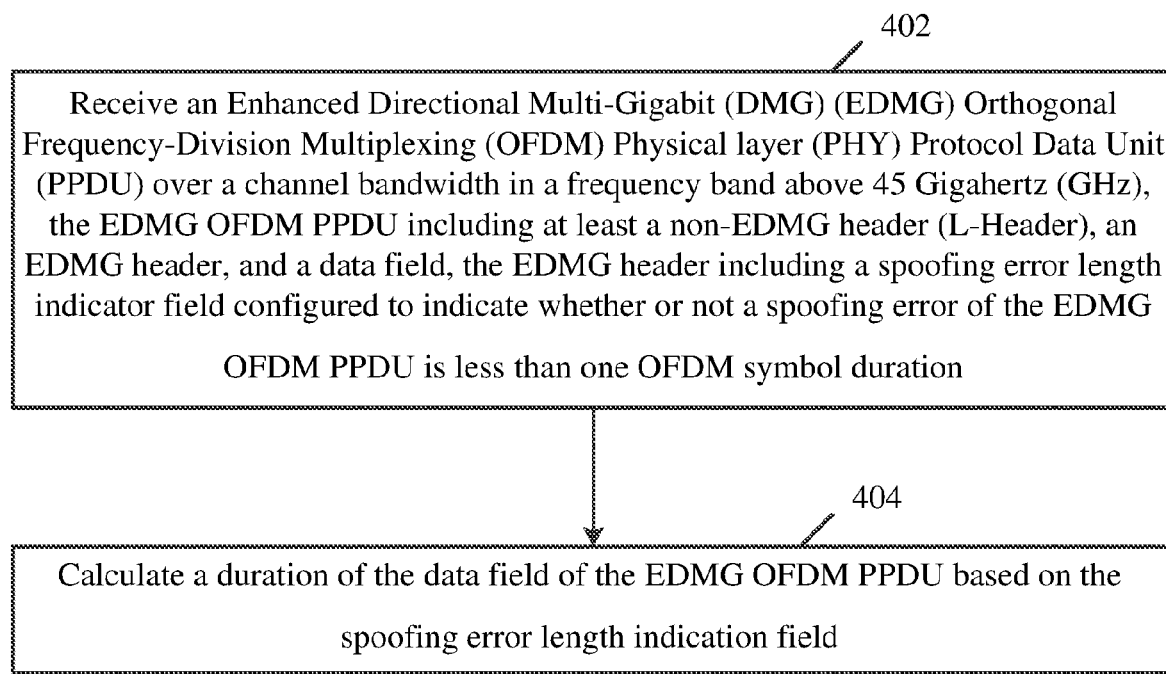
FIG. 4 is a schematic flow-chart illustration of a method of communicating an EDMG OFDM PPDU, in accordance with some demonstrative embodiments.

Reference is made to FIG. 4, which schematically illustrates a method of communicating an EDMG OFDM PPDU, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include receiving an EDMG OFDM PPDU over a channel bandwidth in a frequency band above 45 GHz, the EDMG OFDM PPDU including at least a non-EDMG header (L-Header), an EDMG header, and a data field, the EDMG header including a spoofing error length indicator field configured to indicate whether or not a spoofing error of the EDMG OFDM PPDU is less than one OFDM symbol duration. For example, controller 154 (FIG. 1) may be configured to cause, trigger, and/or control the wireless station implemented by device 140 (FIG. 1) to receiving the EDMG OFDM PPDU over the channel bandwidth in the frequency band above 45 GHz, the EDMG OFDM PPDU including the non-EDMG header (L-Header), the EDMG header, and the data field, the EDMG header including the spoofing error length indicator field configured to indicate whether or not the spoofing error of the EDMG OFDM PPDU is less than one OFDM symbol duration, e.g., as described above.

As indicated at block 404, the method may include calculating a duration of the data field of the EDMG OFDM PPDU based on the spoofing error length indication field. For example, controller 154 (FIG. 1) may be configured to cause, trigger, and/or control the wireless station implemented by device 140 (FIG. 1) to calculate the duration of the data field of the EDMG OFDM PPDU based on the spoofing error length indication field, e.g., as described above.

Figure 5:
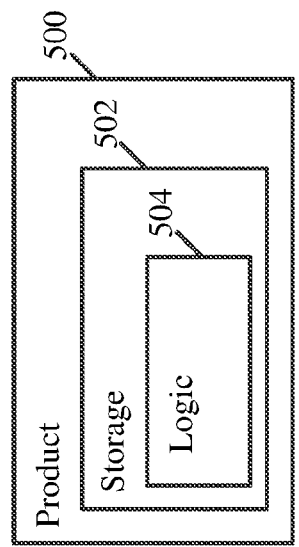
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 500 and/or machine readable storage media 502 may include one or more types of computer-readable storage media capable of storing data, including volatile memory, non-volatile memory, removable or non-removable memory, erasable or non-erasable memory, writeable or re-writeable memory, and the like. For example, machine readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) station (STA) to generate an EDMG Orthogonal Frequency-Division Multiplexing (OFDM) Physical layer (PHY) Protocol Data Unit (PPDU) comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and transmit the EDMG OFDM PPDU over a channel bandwidth in a frequency band above 45 Gigahertz (GHz).

Example 2 includes the subject matter of Example 1, and optionally, wherein the apparatus is configured to cause the EDMG STA to set the spoofing error length indicator field to a first value or a second value, the first value to indicate that the spoofing error of the EDMG OFDM PPDU is less than one OFDM symbol duration, and the second value to indicate that the spoofing error of the EDMG OFDM PPDU is equal to or greater than one OFDM symbol duration.

Example 3 includes the subject matter of Example 2, and optionally, wherein the first value is "0" and the second value is "1".

Example 4 includes the subject matter of any one of Examples 1-3, and optionally, wherein the spoofing error length indicator field comprises one bit.

Example 5 includes the subject matter of any one of Examples 1-4, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 6 includes the subject matter of Example 5, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 7 includes the subject matter of any one of Examples 1-6, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 8 includes the subject matter of any one of Examples 1-7, and optionally, wherein the spoofing error length indicator field is configured to support calculation at a receiver STA of a number of one or more padding OFDM symbols after the data field.

Example 9 includes the subject matter of any one of Examples 1-8, and optionally, wherein the spoofing error length indicator field is configured to support calculation at a receiver STA of a beginning of a Training (TRN) field after the data field in the EDMG OFDM PPDU.

Example 10 includes the subject matter of any one of Examples 1-9, and optionally, wherein the apparatus is configured to cause the EDMG STA to transmit the EDMG OFDM PPDU over a channel bandwidth of at least 2.16 GHz.

Example 11 includes the subject matter of any one of Examples 1-10, and optionally, comprising a radio.

Example 12 includes the subject matter of any one of Examples 1-11, and optionally, comprising one or more antennas.

Example 13 includes a system of wireless communication comprising an Enhanced Directional Multi-Gigabit (DMG) (EDMG) station (STA), the EDMG STA comprising one or more antennas; a radio; a memory; a processor; and a controller configured to cause the EDMG STA to generate an EDMG Orthogonal Frequency-Division Multiplexing (OFDM) Physical layer (PHY) Protocol Data Unit (PPDU) comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and transmit the EDMG OFDM PPDU over a channel bandwidth in a frequency band above 45 Gigahertz (GHz).

Example 14 includes the subject matter of Example 13, and optionally, wherein the controller is configured to cause the EDMG STA to set the spoofing error length indicator field to a first value or a second value, the first value to indicate that the spoofing error of the EDMG OFDM PPDU is less than one OFDM symbol duration, and the second value to indicate that the spoofing error of the EDMG OFDM PPDU is equal to or greater than one OFDM symbol duration.

Example 15 includes the subject matter of Example 14, and optionally, wherein the first value is "0" and the second value is "1".

Example 16 includes the subject matter of any one of Examples 13-15, and optionally, wherein the spoofing error length indicator field comprises one bit.

Example 17 includes the subject matter of any one of Examples 13-16, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 18 includes the subject matter of Example 17, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 19 includes the subject matter of any one of Examples 13-18, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 20 includes the subject matter of any one of Examples 13-19, and optionally, wherein the spoofing error length indicator field is configured to support calculation at a receiver STA of a number of one or more padding OFDM symbols after the data field.

Example 21 includes the subject matter of any one of Examples 13-20, and optionally, wherein the spoofing error length indicator field is configured to support calculation at a receiver STA of a beginning of a Training (TRN) field after the data field in the EDMG OFDM PPDU.

Example 22 includes the subject matter of any one of Examples 13-21, and optionally, wherein the controller is configured to cause the EDMG STA to transmit the EDMG OFDM PPDU over a channel bandwidth of at least 2.16 GHz.

Example 23 includes a method to be performed at an Enhanced Directional Multi-Gigabit (DMG) (EDMG) station (STA), the method comprising generating an EDMG Orthogonal Frequency-Division Multiplexing (OFDM) Physical layer (PHY) Protocol Data Unit (PPDU) comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and transmitting the EDMG OFDM PPDU over a channel bandwidth in a frequency band above 45 Gigahertz (GHz).

Example 24 includes the subject matter of Example 23, and optionally, comprising setting the spoofing error length indicator field to a first value or a second value, the first value to indicate that the spoofing error of the EDMG OFDM PPDU is less than one OFDM symbol duration, and the second value to indicate that the spoofing error of the EDMG OFDM PPDU is equal to or greater than one OFDM symbol duration.

Example 25 includes the subject matter of Example 24, and optionally, wherein the first value is "0" and the second value is "1".

Example 26 includes the subject matter of any one of Examples 23-25, and optionally, wherein the spoofing error length indicator field comprises one bit.

Example 27 includes the subject matter of any one of Examples 23-26, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 28 includes the subject matter of Example 27, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 29 includes the subject matter of any one of Examples 23-28, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 30 includes the subject matter of any one of Examples 23-29, and optionally, wherein the spoofing error length indicator field is configured to support calculation at a receiver STA of a number of one or more padding OFDM symbols after the data field.

Example 31 includes the subject matter of any one of Examples 23-30, and optionally, wherein the spoofing error length indicator field is configured to support calculation at a receiver STA of a beginning of a Training (TRN) field after the data field in the EDMG OFDM PPDU.

Example 32 includes the subject matter of any one of Examples 23-31, and optionally, comprising transmitting the EDMG OFDM PPDU over a channel bandwidth of at least 2.16 GHz.

Example 33 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) station (STA) to generate an EDMG Orthogonal Frequency-Division Multiplexing (OFDM) Physical layer (PHY) Protocol Data Unit (PPDU) comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and transmit the EDMG OFDM PPDU over a channel bandwidth in a frequency band above 45 Gigahertz (GHz).

Example 34 includes the subject matter of Example 33, and optionally, wherein the instructions, when executed, cause the EDMG STA to set the spoofing error length indicator field to a first value or a second value, the first value to indicate that the spoofing error of the EDMG OFDM PPDU is less than one OFDM symbol duration, and the second value to indicate that the spoofing error of the EDMG OFDM PPDU is equal to or greater than one OFDM symbol duration.

Example 35 includes the subject matter of Example 34, and optionally, wherein the first value is "0" and the second value is "1".

Example 36 includes the subject matter of any one of Examples 33-35, and optionally, wherein the spoofing error length indicator field comprises one bit.

Example 37 includes the subject matter of any one of Examples 33-36, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 38 includes the subject matter of Example 37, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 39 includes the subject matter of any one of Examples 33-38, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 40 includes the subject matter of any one of Examples 33-39, and optionally, wherein the spoofing error length indicator field is configured to support calculation at a receiver STA of a number of one or more padding OFDM symbols after the data field.

Example 41 includes the subject matter of any one of Examples 33-40, and optionally, wherein the spoofing error length indicator field is configured to support calculation at a receiver STA of a beginning of a Training (TRN) field after the data field in the EDMG OFDM PPDU.

Example 42 includes the subject matter of any one of Examples 33-41, and optionally, wherein the instructions, when executed, cause the EDMG STA to transmit the EDMG OFDM PPDU over a channel bandwidth of at least 2.16 GHz.

Example 43 includes an apparatus of wireless communication by an Enhanced Directional Multi-Gigabit (DMG) (EDMG) station (STA), the apparatus comprising means for generating an EDMG Orthogonal Frequency-Division Multiplexing (OFDM) Physical layer (PHY) Protocol Data Unit (PPDU) comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and means for transmitting the EDMG OFDM PPDU over a channel bandwidth in a frequency band above 45 Gigahertz (GHz).

Example 44 includes the subject matter of Example 43, and optionally, comprising means for setting the spoofing error length indicator field to a first value or a second value, the first value to indicate that the spoofing error of the EDMG OFDM PPDU is less than one OFDM symbol duration, and the second value to indicate that the spoofing error of the EDMG OFDM PPDU is equal to or greater than one OFDM symbol duration.

Example 45 includes the subject matter of Example 44, and optionally, wherein the first value is "0" and the second value is "1".

Example 46 includes the subject matter of any one of Examples 43-45, and optionally, wherein the spoofing error length indicator field comprises one bit.

Example 47 includes the subject matter of any one of Examples 43-46, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 48 includes the subject matter of Example 47, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 49 includes the subject matter of any one of Examples 43-48, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 50 includes the subject matter of any one of Examples 43-49, and optionally, wherein the spoofing error length indicator field is configured to support calculation at a receiver STA of a number of one or more padding OFDM symbols after the data field.

Example 51 includes the subject matter of any one of Examples 43-50, and optionally, wherein the spoofing error length indicator field is configured to support calculation at a receiver STA of a beginning of a Training (TRN) field after the data field in the EDMG OFDM PPDU.

Example 52 includes the subject matter of any one of Examples 43-51, and optionally, comprising means for transmitting the EDMG OFDM PPDU over a channel bandwidth of at least 2.16 GHz.

Example 53 includes an apparatus comprising logic and circuitry configured to cause an Enhanced Directional Multi-Gigabit (DMG) (EDMG) station (STA) to receive an EDMG Orthogonal Frequency-Division Multiplexing (OFDM)

Physical layer (PHY) Protocol Data Unit (PPDU) over a channel bandwidth in a frequency band above 45 Gigahertz (GHz), the EDMG OFDM PPDU comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and calculate a duration of the data field of the EDMG OFDM PPDU based on the spoofing error length indication field.

Example 54 includes the subject matter of Example 53, and optionally, wherein the apparatus is configured to cause the EDMG STA to determine that the spoofing error of the EDMG OFDM PPDU is less than one OFDM symbol duration, when the spoofing error length indicator field has a first value, and to determine that the spoofing error of the EDMG OFDM PPDU is equal to or greater than one OFDM symbol duration, when the spoofing error length indicator field has a second value.

Example 55 includes the subject matter of Example 54, and optionally, wherein the first value is "0" and the second value is "1".

Example 56 includes the subject matter of any one of Examples 53-55, and optionally, wherein the spoofing error length indicator field comprises one bit.

Example 57 includes the subject matter of any one of Examples 53-56, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 58 includes the subject matter of Example 57, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 59 includes the subject matter of any one of Examples 53-58, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 60 includes the subject matter of any one of Examples 53-59, and optionally, wherein the apparatus is configured to cause the EDMG STA to determine a number of one or more padding OFDM symbols after the data field based on the spoofing error length indicator field.

Example 61 includes the subject matter of Example 60, and optionally, wherein the apparatus is configured to cause the EDMG STA to determine a calculated number of padding OFDM symbols based on the L-header, and to select whether or not to discard at least one padding OFDM symbol from the calculated number of padding OFDM symbols based on the spoofing error length indicator field.

Example 62 includes the subject matter of Example 61, and optionally, wherein the apparatus is configured to cause the EDMG STA to select to discard the at least one padding OFDM symbol when the spoofing error length indicator field is to indicate that the spoofing error of the EDMG OFDM PPDU is not less than one OFDM symbol duration.

Example 63 includes the subject matter of Example 61, and optionally, wherein the apparatus is configured to cause the EDMG STA to select to discard less than one padding OFDM symbol when the spoofing error length indicator field is to indicate that the spoofing error of the EDMG OFDM PPDU is less than one OFDM symbol duration.

Example 64 includes the subject matter of any one of Examples 53-63, and optionally, wherein the apparatus is configured to cause the EDMG to determine a beginning of a Training (TRN) field after the data field in the EDMG OFDM PPDU based on the spoofing error length indicator field.

Example 65 includes the subject matter of any one of Examples 53-64, and optionally, wherein the apparatus is configured to cause the EDMG STA to determine a total duration of the data field and one or more padding OFDM symbols based on a plurality of values in the L-Header of the EDMG OFDM PPDU; determine a number of data OFDM symbols of the data field based on the spoofing error length indicator field and the total duration of the data field and the padding OFDM symbols; and determine the duration of the data field based on the number of data OFDM symbols.

Example 66 includes the subject matter of any one of Examples 53-65, and optionally, wherein the apparatus is configured to allow the EDMG STA to enter a power save state based on the calculated duration of the data field.

Example 67 includes the subject matter of any one of Examples 53-66, and optionally, wherein the apparatus is configured to cause the EDMG STA to receive the EDMG OFDM PPDU over a channel bandwidth of at least 2.16 GHz.

Example 68 includes the subject matter of any one of Examples 53-67, and optionally, comprising a radio.

Example 69 includes the subject matter of any one of Examples 53-68, and optionally, comprising one or more antennas.

Example 70 includes a system of wireless communication comprising an Enhanced Directional Multi-Gigabit (DMG) (EDMG) station (STA), the EDMG STA comprising one or more antennas; a radio; a memory; a processor; and a controller configured to cause the EDMG STA to receive an EDMG Orthogonal Frequency-Division Multiplexing (OFDM) Physical layer (PHY) Protocol Data Unit (PPDU) over a channel bandwidth in a frequency band above 45 Gigahertz (GHz), the EDMG OFDM PPDU comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and calculate a duration of the data field of the EDMG OFDM PPDU based on the spoofing error length indication field.

Example 71 includes the subject matter of Example 70, and optionally, wherein the controller is configured to cause the EDMG STA to determine that the spoofing error of the EDMG OFDM PPDU is less than one OFDM symbol duration, when the spoofing error length indicator field has a first value, and to determine that the spoofing error of the EDMG OFDM PPDU is equal to or greater than one OFDM symbol duration, when the spoofing error length indicator field has a second value.

Example 72 includes the subject matter of Example 71, and optionally, wherein the first value is "0" and the second value is "1".

Example 73 includes the subject matter of any one of Examples 70-72, and optionally, wherein the spoofing error length indicator field comprises one bit.

Example 74 includes the subject matter of any one of Examples 70-73, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 75 includes the subject matter of Example 74, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 76 includes the subject matter of any one of Examples 70-75, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 77 includes the subject matter of any one of Examples 70-76, and optionally, wherein the controller is configured to cause the EDMG STA to determine a number of one or more padding OFDM symbols after the data field based on the spoofing error length indicator field.

Example 78 includes the subject matter of Example 77, and optionally, wherein the controller is configured to cause the EDMG STA to determine a calculated number of padding OFDM symbols based on the L-header, and to select whether or not to discard at least one padding OFDM symbol from the calculated number of padding OFDM symbols based on the spoofing error length indicator field.

Example 79 includes the subject matter of Example 78, and optionally, wherein the controller is configured to cause the EDMG STA to select to discard the at least one padding OFDM symbol when the spoofing error length indicator field is to indicate that the spoofing error of the EDMG OFDM PPDU is not less than one OFDM symbol duration.

Example 80 includes the subject matter of Example 78, and optionally, wherein the controller is configured to cause the EDMG STA to select to discard less than one padding OFDM symbol when the spoofing error length indicator field is to indicate that the spoofing error of the EDMG OFDM PPDU is less than one OFDM symbol duration.

Example 81 includes the subject matter of any one of Examples 70-80, and optionally, wherein the controller is configured to cause the EDMG to determine a beginning of a Training (TRN) field after the data field in the EDMG OFDM PPDU based on the spoofing error length indicator field.

Example 82 includes the subject matter of any one of Examples 70-81, and optionally, wherein the controller is configured to cause the EDMG STA to determine a total duration of the data field and one or more padding OFDM symbols based on a plurality of values in the L-Header of the EDMG OFDM PPDU; determine a number of data OFDM symbols of the data field based on the spoofing error length indicator field and the total duration of the data field and the padding OFDM symbols; and determine the duration of the data field based on the number of data OFDM symbols.

Example 83 includes the subject matter of any one of Examples 70-82, and optionally, wherein the controller is configured to allow the EDMG STA to enter a power save state based on the calculated duration of the data field.

Example 84 includes the subject matter of any one of Examples 70-83, and optionally, wherein the controller is configured to cause the EDMG STA to receive the EDMG OFDM PPDU over a channel bandwidth of at least 2.16 GHz.

Example 85 includes a method to be performed at an Enhanced Directional Multi-Gigabit (DMG) (EDMG) station (STA), the method comprising receiving an EDMG Orthogonal Frequency-Division Multiplexing (OFDM) Physical layer (PHY) Protocol Data Unit (PPDU) over a channel bandwidth in a frequency band above 45 Gigahertz (GHz), the EDMG OFDM PPDU comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and calculating a duration of the data field of the EDMG OFDM PPDU based on the spoofing error length indication field.

Example 86 includes the subject matter of Example 85, and optionally, comprising determining that the spoofing error of the EDMG OFDM PPDU is less than one OFDM symbol duration, when the spoofing error length indicator field has a first value, and determining that the spoofing error of the EDMG OFDM PPDU is equal to or greater than one OFDM symbol duration, when the spoofing error length indicator field has a second value.

Example 87 includes the subject matter of Example 86, and optionally, wherein the first value is "0" and the second value is "1".

Example 88 includes the subject matter of any one of Examples 85-87, and optionally, wherein the spoofing error length indicator field comprises one bit.

Example 89 includes the subject matter of any one of Examples 85-88, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 90 includes the subject matter of Example 89, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 91 includes the subject matter of any one of Examples 85-90, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 92 includes the subject matter of any one of Examples 85-91, and optionally, comprising determining a number of one or more padding OFDM symbols after the data field based on the spoofing error length indicator field.

Example 93 includes the subject matter of Example 92, and optionally, comprising determining a calculated number of padding OFDM symbols based on the L-header, and selecting whether or not to discard at least one padding OFDM symbol from the calculated number of padding OFDM symbols based on the spoofing error length indicator field.

Example 94 includes the subject matter of Example 93, and optionally, comprising discarding the at least one padding OFDM symbol when the spoofing error length indicator field is to indicate that the spoofing error of the EDMG OFDM PPDU is not less than one OFDM symbol duration.

Example 95 includes the subject matter of Example 93, and optionally, comprising discarding less than one padding OFDM symbol when the spoofing error length indicator field is to indicate that the spoofing error of the EDMG OFDM PPDU is less than one OFDM symbol duration.

Example 96 includes the subject matter of any one of Examples 85-95, and optionally, comprising determining a beginning of a Training (TRN) field after the data field in the EDMG OFDM PPDU based on the spoofing error length indicator field.

Example 97 includes the subject matter of any one of Examples 85-96, and optionally, comprising determining a total duration of the data field and one or more padding OFDM symbols based on a plurality of values in the L-Header of the EDMG OFDM PPDU; determining a number of data OFDM symbols of the data field based on the spoofing error length indicator field and the total duration of the data field and the padding OFDM symbols; and determining the duration of the data field based on the number of data OFDM symbols.

Example 98 includes the subject matter of any one of Examples 85-97, and optionally, comprising allowing the EDMG STA to enter a power save state based on the calculated duration of the data field.

Example 99 includes the subject matter of any one of Examples 85-98, and optionally, comprising receiving the EDMG OFDM PPDU over a channel bandwidth of at least 2.16 GHz.

Example 100 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) station (STA) to receive an EDMG Orthogonal Frequency-Division Multiplexing (OFDM) Physical layer (PHY) Protocol Data Unit (PPDU) over a channel bandwidth in a frequency band above 45 Gigahertz (GHz), the EDMG OFDM PPDU comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and calculate a duration of the data field of the EDMG OFDM PPDU based on the spoofing error length indication field.

Example 101 includes the subject matter of Example 100, and optionally, wherein the instructions, when executed, cause the EDMG STA to determine that the spoofing error of the EDMG OFDM PPDU is less than one OFDM symbol duration, when the spoofing error length indicator field has a first value, and to determine that the spoofing error of the EDMG OFDM PPDU is equal to or greater than one OFDM symbol duration, when the spoofing error length indicator field has a second value.

Example 102 includes the subject matter of Example 101, and optionally, wherein the first value is "0" and the second value is "1".

Example 103 includes the subject matter of any one of Examples 100-102, and optionally, wherein the spoofing error length indicator field comprises one bit.

Example 104 includes the subject matter of any one of Examples 100-103, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 105 includes the subject matter of Example 104, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 106 includes the subject matter of any one of Examples 100-105, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 107 includes the subject matter of any one of Examples 100-106, and optionally, wherein the instructions, when executed, cause the EDMG STA to determine a number of one or more padding OFDM symbols after the data field based on the spoofing error length indicator field.

Example 108 includes the subject matter of Example 107, and optionally, wherein the instructions, when executed, cause the EDMG STA to determine a calculated number of padding OFDM symbols based on the L-header, and to select whether or not to discard at least one padding OFDM symbol from the calculated number of padding OFDM symbols based on the spoofing error length indicator field.

Example 109 includes the subject matter of Example 108, and optionally, wherein the instructions, when executed, cause the EDMG STA to select to discard the at least one padding OFDM symbol when the spoofing error length indicator field is to indicate that the spoofing error of the EDMG OFDM PPDU is not less than one OFDM symbol duration.

Example 110 includes the subject matter of Example 108, and optionally, wherein the instructions, when executed, cause the EDMG STA to select to discard less than one padding OFDM symbol when the spoofing error length indicator field is to indicate that the spoofing error of the EDMG OFDM PPDU is less than one OFDM symbol duration.

Example 111 includes the subject matter of any one of Examples 100-110, and optionally, wherein the instructions, when executed, cause the EDMG to determine a beginning of a Training (TRN) field after the data field in the EDMG OFDM PPDU based on the spoofing error length indicator field.

Example 112 includes the subject matter of any one of Examples 100-111, and optionally, wherein the instructions, when executed, cause the EDMG STA to determine a total duration of the data field and one or more padding OFDM symbols based on a plurality of values in the L-Header of the EDMG OFDM PPDU; determine a number of data OFDM symbols of the data field based on the spoofing error length indicator field and the total duration of the data field and the padding OFDM symbols; and determine the duration of the data field based on the number of data OFDM symbols.

Example 113 includes the subject matter of any one of Examples 100-112, and optionally, wherein the instructions, when executed, allow the EDMG STA to enter a power save state based on the calculated duration of the data field.

Example 114 includes the subject matter of any one of Examples 100-113, and optionally, wherein the instructions, when executed, cause the EDMG STA to receive the EDMG OFDM PPDU over a channel bandwidth of at least 2.16 GHz.

Example 115 includes an apparatus of wireless communication by an Enhanced Directional Multi-Gigabit (DMG) (EDMG) station (STA), the apparatus comprising means for receiving an EDMG Orthogonal Frequency-Division Multiplexing (OFDM) Physical layer (PHY) Protocol Data Unit (PPDU) over a channel bandwidth in a frequency band above 45 Gigahertz (GHz), the EDMG OFDM PPDU comprising at least a non-EDMG header (L-Header), an EDMG header, and a data field, the EDMG header comprising a spoofing error length indicator field configured to indicate whether or not a spoofing error of the EDMG OFDM PPDU is less than one OFDM symbol duration; and means for calculating a duration of the data field of the EDMG OFDM PPDU based on the spoofing error length indication field.

Example 116 includes the subject matter of Example 115, and optionally, comprising means for determining that the spoofing error of the EDMG OFDM PPDU is less than one OFDM symbol duration, when the spoofing error length indicator field has a first value, and determining that the spoofing error of the EDMG OFDM PPDU is equal to or greater than one OFDM symbol duration, when the spoofing error length indicator field has a second value.

Example 117 includes the subject matter of Example 116, and optionally, wherein the first value is "0" and the second value is "1".

Example 118 includes the subject matter of any one of Examples 115-117, and optionally, wherein the spoofing error length indicator field comprises one bit.

Example 119 includes the subject matter of any one of Examples 115-118, and optionally, wherein the spoofing error of the EDMG OFDM PPDU comprises a difference between a calculated PPDU duration and an actual duration of the EDMG OFDM PPDU, the calculated PPDU duration calculated according to the L-header.

Example 120 includes the subject matter of Example 119, and optionally, wherein the L-Header comprises at least a length field, a Training (TRN) length field, and a Modulation and Coding Scheme (MCS) field, the calculated PPDU duration calculated according to the L-header is based on the length field, the TRN length field and the MCS field.

Example 121 includes the subject matter of any one of Examples 115-120, and optionally, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

Example 122 includes the subject matter of any one of Examples 115-121, and optionally, comprising means for determining a number of one or more padding OFDM symbols after the data field based on the spoofing error length indicator field.

Example 123 includes the subject matter of Example 122, and optionally, comprising means for determining a calculated number of padding OFDM symbols based on the L-header, and selecting whether or not to discard at least one padding OFDM symbol from the calculated number of padding OFDM symbols based on the spoofing error length indicator field.

Example 124 includes the subject matter of Example 123, and optionally, comprising means for discarding the at least one padding OFDM symbol when the spoofing error length indicator field is to indicate that the spoofing error of the EDMG OFDM PPDU is not less than one OFDM symbol duration.

Example 125 includes the subject matter of Example 123, and optionally, comprising means for discarding less than one padding OFDM symbol when the spoofing error length indicator field is to indicate that the spoofing error of the EDMG OFDM PPDU is less than one OFDM symbol duration.

Example 126 includes the subject matter of any one of Examples 115-125, and optionally, comprising means for determining a beginning of a Training (TRN) field after the data field in the EDMG OFDM PPDU based on the spoofing error length indicator field.

Example 127 includes the subject matter of any one of Examples 115-126, and optionally, comprising means for determining a total duration of the data field and one or more padding OFDM symbols based on a plurality of values in the L-Header of the EDMG OFDM PPDU; determining a number of data OFDM symbols of the data field based on the spoofing error length indicator field and the total duration of the data field and the padding OFDM symbols; and determining the duration of the data field based on the number of data OFDM symbols.

Example 128 includes the subject matter of any one of Examples 115-127, and optionally, comprising means for allowing the EDMG STA to enter a power save state based on the calculated duration of the data field.

Example 129 includes the subject matter of any one of Examples 115-128, and optionally, comprising means for receiving the EDMG OFDM PPDU over a channel bandwidth of at least 2.16 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a processor comprising logic and circuitry configured to cause an Enhanced Directional Multi-Gigabit (DMG) (EDMG) wireless communication station (STA) to:
      determine a calculated number of padding Orthogonal Frequency-Division Multiplexing (OFDM) symbols based on a non-EDMG header (L-Header) of an EDMG OFDM Physical layer (PHY) Protocol Data Unit (PPDU) received over a channel bandwidth in a frequency band above 45 Gigahertz (GHz);
      determine whether or not to discard at least one padding OFDM symbol from the calculated number of padding OFDM symbols based on a spoofing error length indicator field in an EDMG Header of the EDMG OFDM PPDU, the spoofing error length indicator field to indicate whether or not a spoofing error of the EDMG OFDM PPDU is less than one OFDM symbol duration; and
      process the EDMG OFDM PPDU based on the calculated number of padding OFDM symbols; and
   a memory to store information processed by the processor.

2. The apparatus of claim 1 configured to cause the EDMG STA to determine the calculated number of padding OFDM symbols based on a length field and a Modulation and Coding Scheme (MCS) field in the L-Header; a Training (TRN) length field in an EDMG A Header after the L-Header; and an EDMG MCS field and a PHY Service Data Unit (PSDU) length field in an EDMG Header B after the EDMG Header A.

3. The apparatus of claim 1 configured to cause the EDMG STA to select to discard the at least one padding OFDM symbol when the spoofing error length indicator field is to indicate that the spoofing error of the EDMG OFDM PPDU is equal to or greater than one OFDM symbol duration.

4. The apparatus of claim 1 configured to cause the EDMG STA to select to discard less than one padding OFDM symbol when the spoofing error length indicator field is to indicate that the spoofing error of the EDMG OFDM PPDU is less than one OFDM symbol duration.

5. The apparatus of claim 1 configured to cause the EDMG STA to determine a beginning of a Training (TRN) field of the EDMG OFDM PPDU based on the calculated number of padding OFDM symbols and according to the determination whether or not to discard the at least one padding OFDM symbol from the calculated number of padding OFDM symbols.

6. The apparatus of claim 1, wherein the spoofing error length indicator field comprises a first value or a second value, the first value to indicate that the spoofing error of the EDMG OFDM PPDU is less than one OFDM symbol duration, the second value to indicate that the spoofing error of the EDMG OFDM PPDU is equal to or greater than one OFDM symbol duration.

7. The apparatus of claim 6, wherein the first value is "0" and the second value is "1".

8. The apparatus of claim 1, wherein the spoofing error length indicator field comprises a 1-bit field.

9. The apparatus of claim 1, wherein the spoofing error of the EDMG OFDM PPDU comprises a difference between a calculated PPDU duration and an actual duration of the EDMG OFDM PPDU, the calculated PPDU duration based on the L-header.

10. The apparatus of claim 1, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

11. The apparatus of claim 1 comprising a radio to receive the EDMG OFDM PPDU.

12. The apparatus of claim 11 comprising one or more antennas connected to the radio, and another processor to execute instructions of an operating system.

13. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:
  determine a calculated number of padding Orthogonal Frequency-Division Multiplexing (OFDM) symbols based on a non-EDMG header (L-Header) of an EDMG OFDM Physical layer (PHY) Protocol Data Unit (PPDU) received over a channel bandwidth in a frequency band above 45 Gigahertz (GHz);
  determine whether or not to discard at least one padding OFDM symbol from the calculated number of padding OFDM symbols based on a spoofing error length indicator field in an EDMG Header of the EDMG OFDM PPDU, the spoofing error length indicator field to indicate whether or not a spoofing error of the EDMG OFDM PPDU is less than one OFDM symbol duration; and
  process the EDMG OFDM PPDU based on the calculated number of padding OFDM symbols.

14. The product of claim 13, wherein the instructions, when executed, cause the EDMG STA to determine the calculated number of padding OFDM symbols based on a length field and a Modulation and Coding Scheme (MCS) field in the L-Header; a Training (TRN) length field in an EDMG A Header after the L-Header; and an EDMG MCS field and a PHY Service Data Unit (PSDU) length field in an EDMG Header B after the EDMG Header A.

15. The product of claim 13, wherein the instructions, when executed, cause the EDMG STA to select to discard the at least one padding OFDM symbol when the spoofing error length indicator field is to indicate that the spoofing error of the EDMG OFDM PPDU is equal to or greater than one OFDM symbol duration.

16. The product of claim 13, wherein the instructions, when executed, cause the EDMG STA to select to discard less than one padding OFDM symbol when the spoofing error length indicator field is to indicate that the spoofing error of the EDMG OFDM PPDU is less than one OFDM symbol duration.

17. The product of claim 13, wherein the instructions, when executed, cause the EDMG STA to determine a beginning of a Training (TRN) field of the EDMG OFDM PPDU based on the calculated number of padding OFDM symbols and according to the determination whether or not to discard the at least one padding OFDM symbol from the calculated number of padding OFDM symbols.

18. The product of claim 13, wherein the spoofing error length indicator field comprises a first value or a second value, the first value to indicate that the spoofing error of the EDMG OFDM PPDU is less than one OFDM symbol duration, the second value to indicate that the spoofing error of the EDMG OFDM PPDU is equal to or greater than one OFDM symbol duration.

19. The product of claim 13, wherein the spoofing error length indicator field comprises a 1-bit field.

20. The product of claim 13, wherein the spoofing error of the EDMG OFDM PPDU comprises a difference between a calculated PPDU duration and an actual duration of the EDMG OFDM PPDU, the calculated PPDU duration based on the L-header.

21. The product of claim 13, wherein the EDMG OFDM PPDU comprises a Multi-User (MU) PPDU, the MU PPDU comprising an EDMG Header A after the L-Header, and an EDMG Header B after the EDMG Header A, the EDMG Header B comprising the spoofing error length indicator field.

22. An apparatus comprising:
  means for causing an Enhanced Directional Multi-Gigabit (DMG) (EDMG) wireless communication station (STA) to determine a calculated number of padding Orthogonal Frequency-Division Multiplexing (OFDM) symbols based on a non-EDMG header (L-Header) of an EDMG OFDM Physical layer (PHY) Protocol Data Unit (PPDU) received over a channel bandwidth in a frequency band above 45 Gigahertz (GHz);
  means for causing the EDMG STA to determine whether or not to discard at least one padding OFDM symbol from the calculated number of padding OFDM symbols based on a spoofing error length indicator field in an EDMG Header of the EDMG OFDM PPDU, the spoofing error length indicator field to indicate whether or not a spoofing error of the EDMG OFDM PPDU is less than one OFDM symbol duration; and
  means for causing the EDMG STA to process the EDMG OFDM PPDU based on the calculated number of padding OFDM symbols.

23. The apparatus of claim 22 comprising means for causing the EDMG STA to determine the calculated number of padding OFDM symbols based on a length field and a Modulation and Coding Scheme (MCS) field in the L-Header; a Training (TRN) length field in an EDMG A Header after the L-Header; and an EDMG MCS field and a PHY Service Data Unit (PSDU) length field in an EDMG Header B after the EDMG Header A.

* * * * *